(12) United States Patent
Dalamarinis

(10) Patent No.: US 11,753,923 B2
(45) Date of Patent: Sep. 12, 2023

(54) USING PRE-FRACTURING HYDRAULIC CONDUCTIVITY MEASUREMENTS TO AVOID FRACTURE TREATMENT PROBLEMS

(71) Applicant: Seismos, Inc., Austin, TX (US)

(72) Inventor: Panagiotis Dalamarinis, Austin, TX (US)

(73) Assignee: SEISMOS, INC., Austin, TX (US)

( * ) Notice: Subject to any disclaimer, the term of this patent is extended or adjusted under 35 U.S.C. 154(b) by 77 days.

(21) Appl. No.: 17/457,993

(22) Filed: Dec. 7, 2021

(65) Prior Publication Data

US 2022/0090483 A1 Mar. 24, 2022

Related U.S. Application Data

(63) Continuation of application No. PCT/US2020/037494, filed on Jun. 12, 2020.

(60) Provisional application No. 62/861,097, filed on Jun. 13, 2019.

(51) Int. Cl.
*E21B 47/107* (2012.01)
*E21B 43/26* (2006.01)
*E21B 47/00* (2012.01)
*G08B 21/18* (2006.01)

(52) U.S. Cl.
CPC ............. *E21B 47/00* (2013.01); *E21B 43/26* (2013.01); *G08B 21/182* (2013.01); *E21B 2200/06* (2020.05); *E21B 2200/20* (2020.05)

(58) Field of Classification Search
CPC ...... E21B 43/26; E21B 47/095; E21B 47/107; G01V 1/50
See application file for complete search history.

(56) References Cited

U.S. PATENT DOCUMENTS

| | | | |
|---|---|---|---|
| 5,081,613 A | 1/1992 | Holzhausen et al. | |
| 5,616,840 A * | 4/1997 | Tang | G01V 1/48 73/152.16 |
| 7,359,800 B2 * | 4/2008 | Rabinovich | G01V 3/28 702/7 |
| 9,658,357 B2 * | 5/2017 | Kabannik | E21B 47/14 |
| 9,995,837 B2 * | 6/2018 | Collins | G01V 1/40 |
| 10,267,941 B2 * | 4/2019 | Collins | G01V 1/50 |

(Continued)

OTHER PUBLICATIONS

International Search Report and Written Opinion, International Application No. PCT/US2020/037494 dated Sep. 18, 2020.

*Primary Examiner* — Kenneth L Thompson
(74) *Attorney, Agent, or Firm* — Richard A. Fagin

(57) ABSTRACT

A method for predicting fracture treatment performance includes inducing tube waves in a well drilled through a formation to be fracture treated. A polarity of reflected tube waves in the well is determined, and using the reflected tube waves, hydraulic conductivity of at least one zone in the well hydraulically connected to the formation is estimated. The estimated hydraulic conductivity is compared to a selected threshold. The selected threshold is based on pumping parameters and pumping pressure behavior of at least one pumped hydraulic fracture treatment. A warning signal is generated when the hydraulic conductivity is below the selected threshold and/or the determined polarity indicates a closed boundary condition so that the treatment may be adjusted to avoid screenouts and other operational and treatment issues.

21 Claims, 12 Drawing Sheets

(56) References Cited

U.S. PATENT DOCUMENTS

| | | | |
|---|---|---|---|
| 11,035,223 B2* | 6/2021 | Kabannik | G01V 1/44 |
| 11,261,721 B2* | 3/2022 | Hornby | G01V 1/50 |
| 2011/0257944 A1 | 10/2011 | Du et al. | |
| 2013/0079935 A1 | 3/2013 | Kabannik et al. | |
| 2019/0136684 A1 | 5/2019 | Felkl et al. | |
| 2021/0032978 A1* | 2/2021 | Kabannik | G01V 1/48 |
| 2022/0056793 A1* | 2/2022 | Korkin | E21B 47/00 |

\* cited by examiner

USING PRE-FRACTURING HYDRAULIC CONDUCTIVITY MEASUREMENTS TO AVOID FRACTURE TREATMENT PROBLEMS

CROSS REFERENCE TO RELATED APPLICATIONS

Continuation of International Application No. PCT/US2020/037494 filed Jun. 12, 2020. Priority is claimed from U.S. Provisional Application No. 62/861,097 filed Jun. 13, 2019. Both the foregoing applications are incorporated herein by reference in their entirety.

STATEMENT REGARDING FEDERALLY SPONSORED RESEARCH OR DEVELOPMENT

Not Applicable

NAMES OF THE PARTIES TO A JOINT RESEARCH AGREEMENT

Not Applicable.

BACKGROUND

This disclosure relates to the field of hydraulic fracturing treatment of an unconventional well in a subterranean formation. More specifically, the disclosure relates to a method for evaluating pre-fracturing hydraulic conductivity (related to perforation to reservoir tunnel coupling) prior to fracturing treatment to predict and to avoid problems occurring during subsequent pumping of a fracture treatment.

Perforation operations may fail to initiate a well-established well-to-reservoir connection and could therefore result in inadequate hydraulic communication between the wellbore and the reservoir rock formation. Poorly performing (small, incomplete, plugged, etc.) perforations or sliding sleeves may increase the overall pumping pressure during the hydraulic fracturing treatment and limit the flow capacity into the remaining perforations along a stage, thus limiting the completion effectiveness. This can result in localized reservoir over- and under-stimulation along a stage, high perforation friction pressure losses, and overall undesirable high treatment pressures. The pumping pressure difficulties ultimately result in less-than-optimal reservoir stimulation and ultimately lower fluid production.

Some of the most common causes of poor well to reservoir connection may be associated with perforation (perf) gun failures, sliding sleeve failures, unfavorable rock stress profile, inaccurate perf gun orientation, varying local geomechanical properties and/or debris clogging the perf tunnel. Poor well to reservoir connection may cause unexpected pumping difficulties and complications during hydraulic fracturing treatment, such as:
  Unexpected/unusually high pumping pressures,
  Inability to place all fluid and proppant,
  Inability to achieve planned pumping rate, or
  Screenouts Screenouts (plugging up the wellbore and/or formation and not being able to pump any more fluid or proppant) and other pumping related difficulties raise completion and operational costs by adding non productive time (NPT), increase potential equipment breakdown, loss of resources, material, adding costs of remediations and ultimately loss of reservoir production and hydrocarbon recovery.

Currently, there is a lack of an effective method for early warning of potential fracture treatment complications and screenouts. Diagnostic tools such as downhole cameras, acoustic downhole tools, fiber optics sensing, and logs can be used to investigate the perforation efficiency. However, these methods are costly, require large operational footprints, and because they add to the non productive time they are not commonly implemented.

SUMMARY

One aspect of the present disclosure is a method for evaluating well to reservoir coupling, or the effective hydraulic connectivity/conductivity. This method includes inducing tube waves in a well drilled through a formation to be fracture treated. A polarity of reflected tube waves in the well is determined, and using properties of the reflected tube waves, hydraulic conductivity of at least one zone in the well hydraulically connected to the formation is estimated. The estimated hydraulic conductivity is compared to a selected conductivity threshold. The selected threshold is based on prior measurements of hydraulic conductivity and pumping parameters of at least one pumped hydraulic fracture treatment. A poor well to reservoir coupling is identified when the hydraulic conductivity is below the selected threshold and/or the determined polarity indicates a "closed" boundary condition. The threshold may be adjusted as the treatment progresses along the wellbore and more information becomes available on both pre-fracture treatment conductivity values and how the stage pumping went (e.g., lower or higher treating pressure required, screenout or near-screenout events, etc.).

In some embodiments, the at least one pumped hydraulic fracture treatment is made in a treatment stage in the well already having a fracture treatment pumped into the treatment stage.

In some embodiments, the selected threshold is estimated using measurements from at least one pumped hydraulic fracture treatment made in a different well.

In some embodiments, the selected threshold is obtained from a model or simulation.

In some embodiments, the opening the wellbore connection to the reservoir includes the perforating operations.

In some embodiments, the opening the wellbore fluid connection comprises opening a sliding sleeve.

Some embodiments further comprise changing at least one fracture treatment parameter from a fracture treatment plan and pumping a fracture treatment using the changed at least one fracture treatment parameter.

In some embodiments, the at least one fracture treatment parameters comprises at least one of proppant concentration, proppant density, proppant amount, proppant particle size distribution, proppant particle shape, fluid type/composition, fluid viscosity, fluid viscosity change rate, fluid pumping rate, fluid temperature, fluid chemical composition, chemical additives, co-injection of energized gases in both liquid and gas phases, injection of petroleum distillates, pH of injection fluid, fluid pumping pressure, diverter type, perforation location, number of perforations, angle of perforations, size of perforations, perforation charge energy, depth of perforations, plug type, and stage length.

In some embodiments, the threshold determined to issue a warning is adaptively re-calibrated.

A method for predicting fracture treatment performance according to another aspect of the disclosure includes inducing tube waves in a well drilled through a formation to be fracture treated. A polarity of reflected tube waves in the well is determined and the reflected tube waves are used to estimate hydraulic conductivity of at least one zone in the well hydraulically connected to the formation. The estimated hydraulic conductivity is compared to a selected threshold. The selected threshold is based on pumping parameters of at least one pumped hydraulic fracture treatment. The estimated hydraulic conductivity is compared to lithology content, and a warning signal is generated when the hydraulic conductivity is below the selected threshold and/or the determined polarity indicates a closed boundary condition.

In some embodiments, the lithology content includes at least one of limestone component and other minerals that could affect the efficiency of perforations.

In an apparatus or system embedded in a computer according to another aspect of the disclosure, the computer has logic thereon operable to cause the computer to perform acts comprising operating a source to induce tube waves in a well drilled through a formation to be fracture treated during or after opening a wellbore fluid connection to the formation; determining a polarity of reflected tube waves in the well and using the reflected tube waves to estimate hydraulic conductivity of at least one zone in the well hydraulically connected to the formation; comparing the estimated hydraulic conductivity to a selected threshold, the selected threshold based on pumping parameters of at least one pumped hydraulic fracture treatment; and generating a warning signal when the hydraulic conductivity is below the selected threshold and/or the determined polarity indicates a closed boundary condition.

A non-transitory computer readable medium according to another aspect of the disclosure has logic stored thereon, the logic operable to cause a programmable computer to perform acts comprising: operating a source to induce tube waves in a well drilled through a formation to be fracture treated during or after opening a wellbore fluid connection to the formation; determining a polarity of reflected tube waves in the well and using the reflected tube waves to estimate hydraulic conductivity of at least one zone in the well hydraulically connected to the formation; comparing the estimated hydraulic conductivity to a selected threshold, the selected threshold based on pumping parameters of at least one pumped hydraulic fracture treatment; and generating a warning signal when the hydraulic conductivity is below the selected threshold and/or the determined polarity indicates a closed boundary condition.

In some embodiments, the at least one pumped hydraulic fracture treatment is made in a treatment stage in the well already having a fracture treatment pumped into the treatment stage.

In some embodiments, the selected threshold is estimated using measurements from at least one pumped hydraulic fracture treatment made in a different well.

In some embodiments, the selected threshold is obtained from a model or simulation.

In some embodiments, the opening the wellbore connection to the reservoir includes the perforating operations.

In some embodiments, the opening the wellbore fluid connection comprises opening a sliding sleeve.

In some embodiments, the logic is further operable to cause the computer to perform changing at least one fracture treatment parameter from a fracture treatment plan and pumping a fracture treatment using the changed at least one fracture treatment parameter.

In some embodiments, the at least one fracture treatment parameters comprises at least one of proppant concentration, proppant density, proppant amount, proppant particle size distribution, proppant particle shape, fluid type/composition, fluid viscosity, fluid viscosity change rate, fluid pumping rate, fluid temperature, fluid chemical composition, chemical additives, co-injection of energized gases in both liquid and gas phases, injection of petroleum distillates, pH of injection fluid, fluid pumping pressure, diverter type, perforation location, number of perforations, angle of perforations, size of perforations, perforation charge energy, depth of perforations, plug type, and stage length.

In some embodiments, the threshold determined to issue a warning is adaptively re-calibrated.

Other aspects and possible advantages will be apparent from the description and claims that follow.

DETAILED DESCRIPTION

Figure 1:
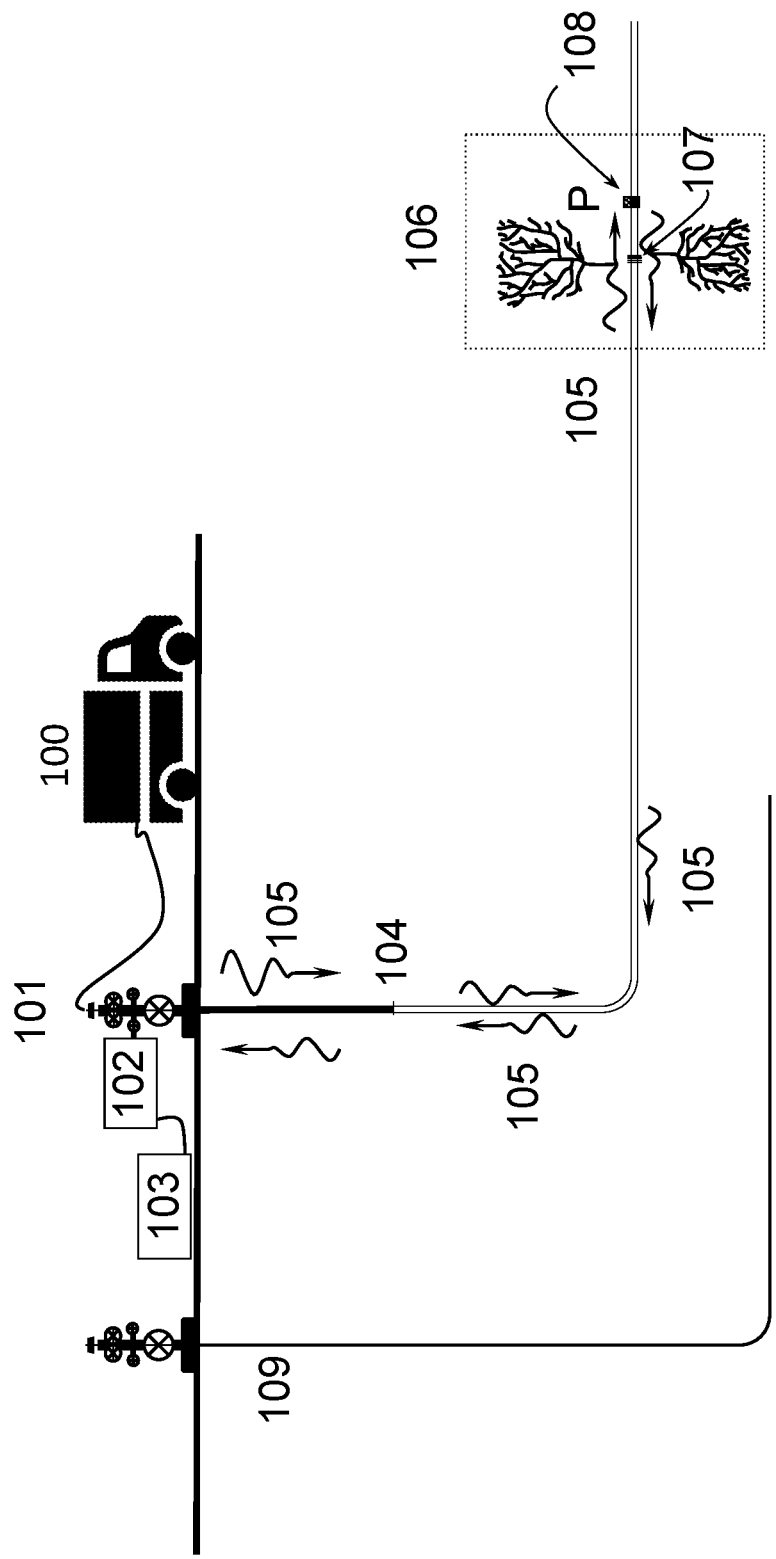
FIG. 1 shows a well equipment arrangement that may be used to acquire signals to implement a method according to the present disclosure.

In FIG. 1, a well, 101, is instrumented with one or more sensors and an acoustic energy source, 102, in the present example embodiment, the one or more sensors may be, for example, a hydrophone, geophone, or a pressure sensor. Signal recording devices and a microcomputer, 103, are located on the surface or near the well, although processing and recording can be performed in other ways, such as remotely over a network connection or other signal channel. The microcomputer 103 may have some or all of the elements of a computing system such as the example embodiment shown in and explained below with reference to FIG. 10. The source, 102, is a device that can induce tube (Stoneley) waves in the wellbore, for example a piston that pushes in or removes a small slug of wellbore fluid in or from the well 101, but a single valve with pressure differential could also be used in a controlled fashion.

The present method relies on tube waves that can be generated by the source 102 or by a variety of known or designed means at the well, 101, travels down the well along the interface between the fluid and wellbore, 105, reflect off of the bottom of well in the current fracture treatment stage, 106, (the primary reflector in this case is a set bridge plug separating stages in hydraulic fracturing, or well bottom), 108, and return to the wellhead some time later where signals generated by the sensor in response are recorded. Secondary reflection points for the induced tube waves are fracture mouths/perforations, 107, well diameter changes, 104, and other changes in casing, e.g., casing wall thickness or surrounding rock formations. These non-primary reflections, as they are static, form a baseline and do not change with respect to the wellbore and as such can be taken into account and their effects removed from the recorded pressure (or pressure time gradient) signals for subsequent analysis.

Other, fluid pumping operations-related tube waves can also be used as a source of acoustic or tube waves for methods according to the present disclosure. As cited and herein incorporated by reference, U.S. Pat. No. 10,641,090 issued to Felkl et al. discloses a method that uses the reflected wavetrain to estimate the $Nkw/\mu$ factor of a fracture, where N is number of "fractures", k is permeability, w is fracture width and p is fluid viscosity. In particular, the factor kw can be understood as "conductivity", where N and $\mu$ are considered fixed.

The conductivity of hydraulic fractures in communication with a well in a multistage plug-and-perforate stimulation treatment may thus be estimated from tube wave reflections, noting that an example method of such estimation is described in U.S. Pat. No. 10,641,090 issued to Felkl et al. and incorporated herein by reference. Other methods of measuring bottom hole properties, such as wellbore-formation conductivity, are possible as a combination of or one of which may be using downhole tools/probes, acoustic downhole tools, fiber optic sensing, video imaging, or even diagnostic mini-frac injection tests. Some embodiments may use the method disclosed in the '090 patent, but can be readily adapted to use another information source on the wellbore-reservoir connection, in particular through perforations or as a perforation efficiency, perforation tunnel conductivity, or a similar measurement.

Tube wave reflections are influenced by acoustic source signature, acoustic wave velocity, wellbore attenuation, fluid properties, pressure, temperature, plug properties, plug depth, and most importantly for the present disclosure by the borehole condition near the plug, i.e., perforations and reservoir connectivity. The recorded pressure signals may be inverted and used in computer simulations, which solve partial differential equations governing tube wave propagation and fluid flow in the well, with various objects (e.g., plugs, perforations, fractures) described by models having only a limited number of model parameters.

Figure 2A:
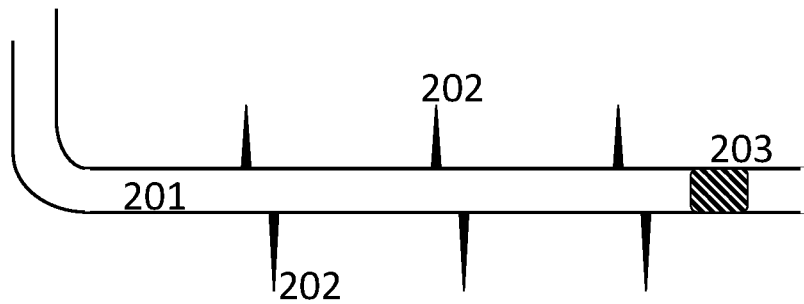
FIGS. 2A through 2D shows examples of general characterization of "quality" of a staged well perforation operation.
Figure 2B:
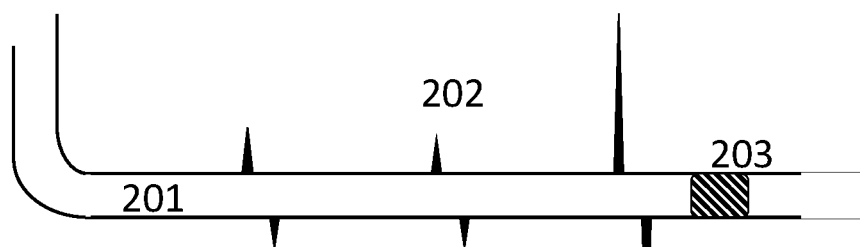
Figure 2C:
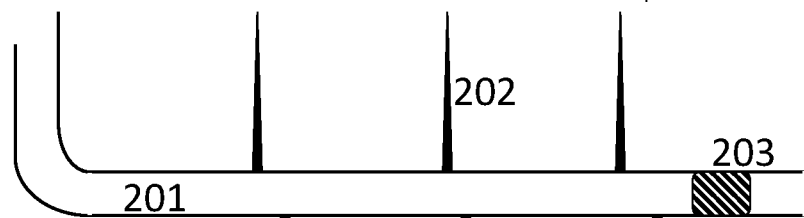
Figure 2D:
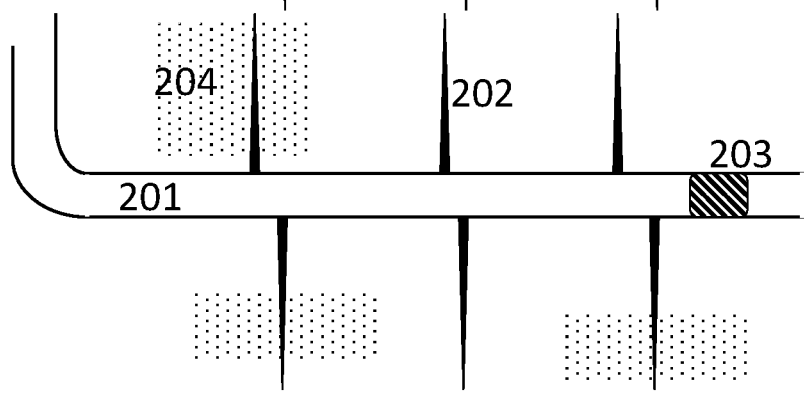

A general characterization of "quality" of a staged well perforation operation is shown in FIGS. 2A-2D, where 201 is the "bottom" end of the wellbore in the region of planned stimulation, 202 is a perforation cluster, 203 represents an isolation plug, and naturally occurring fracture(s) are dashed in as 204. The "bottom" here is understood to be either the true bottom of the wellbore, i.e. treatment stage 1, or the last accessible stage up to an isolation plug, 203, for any stage >1. An even, but weak perforation of 3 clusters (depicted by triangles at a given depth) is shown in FIG. 2A; uneven but stronger perforations in FIG. 2B. Both former cases are less desirable. The following two cases are more desirable: strong, long perforations in FIG. 2C; and strong, even, deep/long perforations with connection to naturally occurring fractures, 204, are shown in FIG. 2D. Typically, perforations reaching the desired depth (length) into the formation and connecting with naturally occurring fractures would be preferred. Good perforation tunnel efficiency, that is, a good reservoir-wellbore connection, or hydraulic conductivity such as shown in FIG. 2D is desirable. The scenarios described with reference to FIGS. 2A-D, would provide measured conductivity (kw) in increasing order.

For a more accurate inversion, forward modeling may be embedded in nonlinear full waveform inversion for parameter estimation. Comparisons between the model and measured pressure data are made in both the time domain (i.e., full waveform inversion) and frequency domain (i.e., matching frequencies and quality factors of resonant modes of the well and reservoir system). The best-fitting parameters determined by nonlinear optimization to minimize misfit in time and/or frequency domain in full waveform inversion can be used to determine conductivity kw shown in FIG. 6. More details on this approach can be found in the '090 patent referred to above.

In methods according to the present disclosure, hydraulic conductivity kw may be calculated as the product of permeability and width of the perforations in the treatment stage. Typically, the width of the perforations is determined by the characteristics of the perforating gun used to perforate the well casing or liner. Even though the above referenced inversion is designed to be applicable to fracture conductivity, it works well in this scenario to evaluate perforations (and perforations connected to naturally-occurring fractures) as well. This measured conductivity can be also called or interpreted as perforation tunnel efficiency, i.e., perforation effectiveness of connection of the wellbore to the reservoir.

The description below describes a model more resembling perforations as cylinders of length L. In some embodiments, the permeability k can be estimated by starting with an oscillatory Darcy flow within the perf stage (Eq. 1). The perf obeys a 1D diffusion equation for pressure, valid in a cylinder of length L and cross-sectional area A filled with material having permeability k, fluid viscosity $\mu$, compressibility $\beta$, and porosity $\phi$.

$$D = \frac{k}{\mu\beta\phi} \quad \text{(Eq. 1)}$$

The measurement of fluid flow in the well can be derived from by "pressure perturbation at perf mouth" and "volumetric flow rate into/out of perf":

$$Z(\omega) = \frac{\mu}{kA} \frac{\coth(\sqrt{-i\omega/D}\, L)}{\sqrt{-i\omega/D}}, \quad \text{(Eq. 2)}$$

where $\sqrt{D/\omega}$ is the diffusion length at angular frequency $\omega$. As permeability k becomes large, then so do D and the diffusion length. When diffusion length >>perf length L, then $\sqrt{\omega/DL} \ll 1$ and we can Taylor expand. The result delivers the value of compressibility used in Eq 1.

$$Z(\omega) \approx \frac{1}{-i\omega AL\phi\beta} \qquad \text{(Eq. 3)}$$

Where ω=angular frequency, m=fluid viscosity, w=width (aperture), k=permeability, R=wellbore radius, β=(sum of fluid compressibility and pore compressibility) times porosity.

Note that AL is perforation volume and ALφ is the pore volume (equal to the fluid volume). Therefore, the combined parameter of relevance is volume times compressibility. This model, although more applicable to perforation geometry, may perform better in certain inversions for pre-fracture (i.e., perforation) conductivities. This model can be inverted using a method described in the '090 patent cited above, by solving for wAL. Ultimately, other models may also be used but the present disclosure can be implemented independent of the means or model used to invert information about near-wellbore connection to the reservoir after perforations have been made in the well casing or liner.

A calibration step may be required by processing an offset well or the initial two stages of subject well(s) in order to generate a near field (NF) conductivity (kw or Nkw/μ) quantity as standard threshold as well as measured post-fracture treatment near field conductivity of prior stage considering the unique borehole and perforation condition. The condition may be subjected to rock heterogeneity, gun performance, and the existence of natural fractures. Because in the above mentioned models, N/μ factor, i.e., the number of perforation clusters and viscosity are assumed and expected to be same for all stages, the choice of comparing kw from any stage does not affect the results, only by a N/μ factor. However, in some cases where the well is the same but the number of clusters (or fluid viscosity) varies between stages, it is advisable to either use Nkw/μ, or normalize (divide) the measurements on more or less perforation cluster stages by a factor of (number of clusters)/N to compare the same range of conductivity values or a per perforation hole or perforation cluster value. A consistent approach will eliminate variability.

Other models such are designed for fracture could also be used due to the similar physical properties to the perforation model. The quantify response in terms of fracture hydraulic impedance explains as pressure perturbation at fracture mouth divided by volumetric flow rate into/out of fracture:

$$Z(\omega) = -\frac{\mu}{2\pi kw}\ln\left(\sqrt{\frac{-i\omega}{D}}R\right), \qquad \text{(Eq. 4)}$$

Figure 3A:
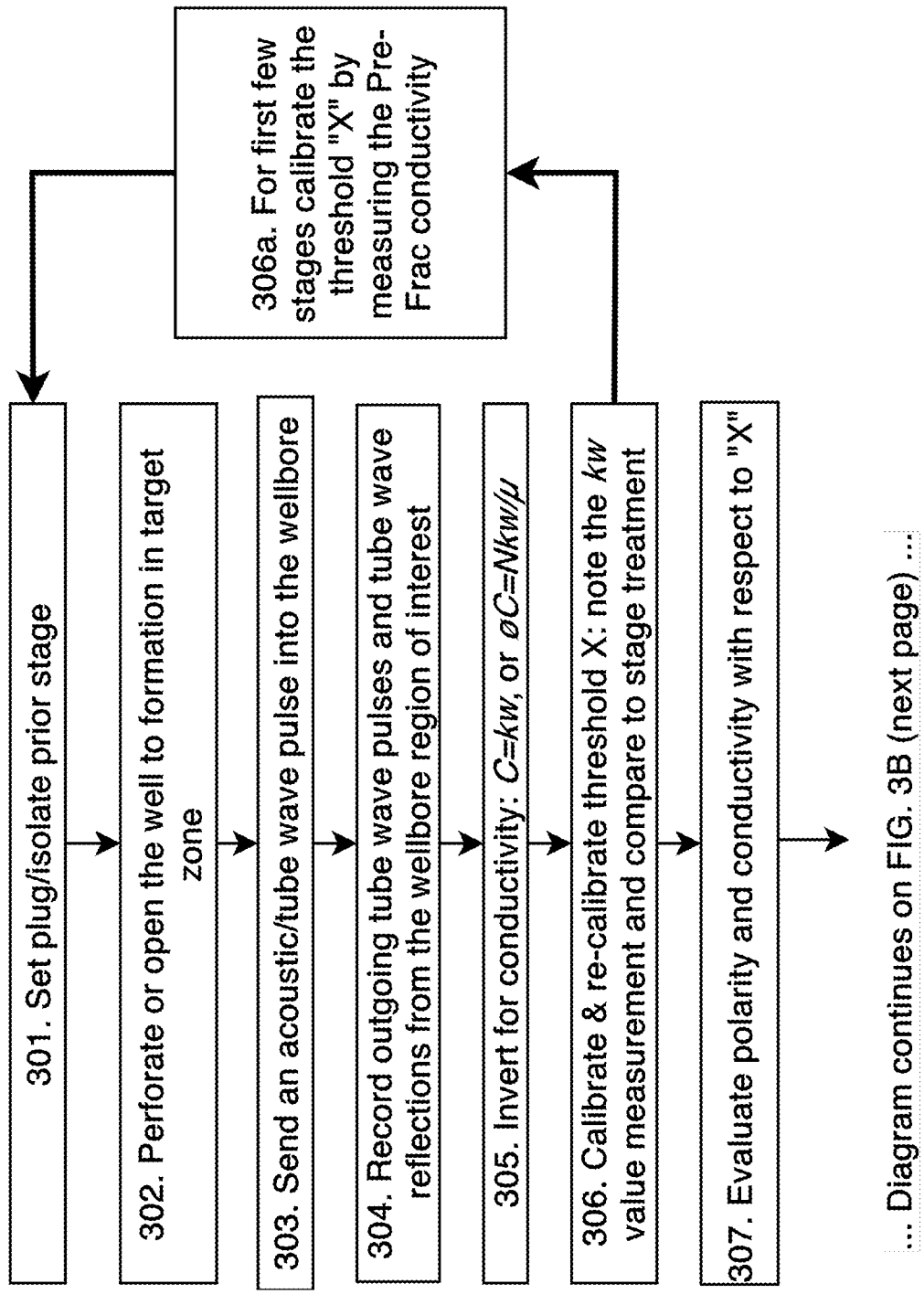
FIGS. 3A-C show a flow chart of example methods according to the present disclosure.
Figure 3B:
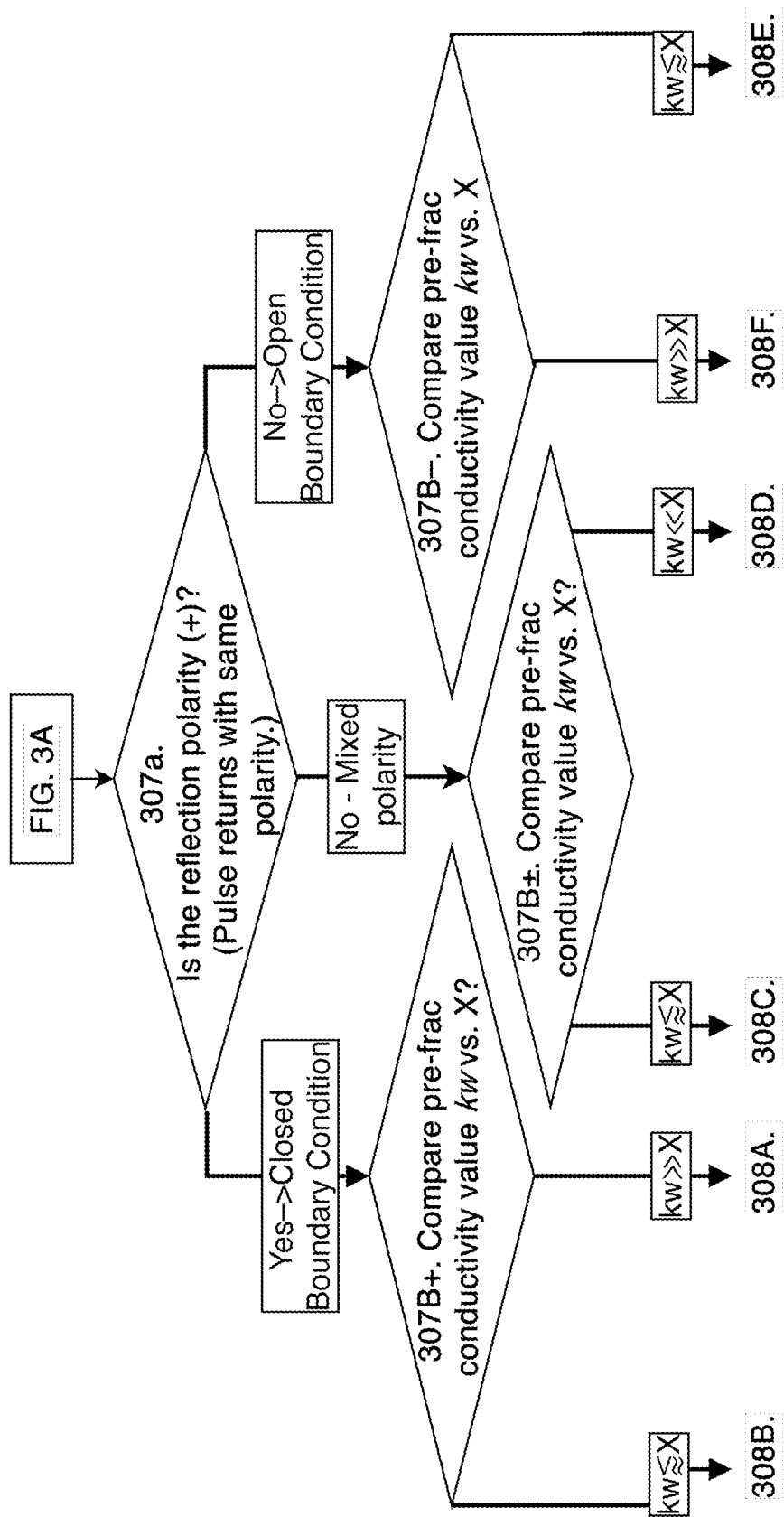
Figure 3C:
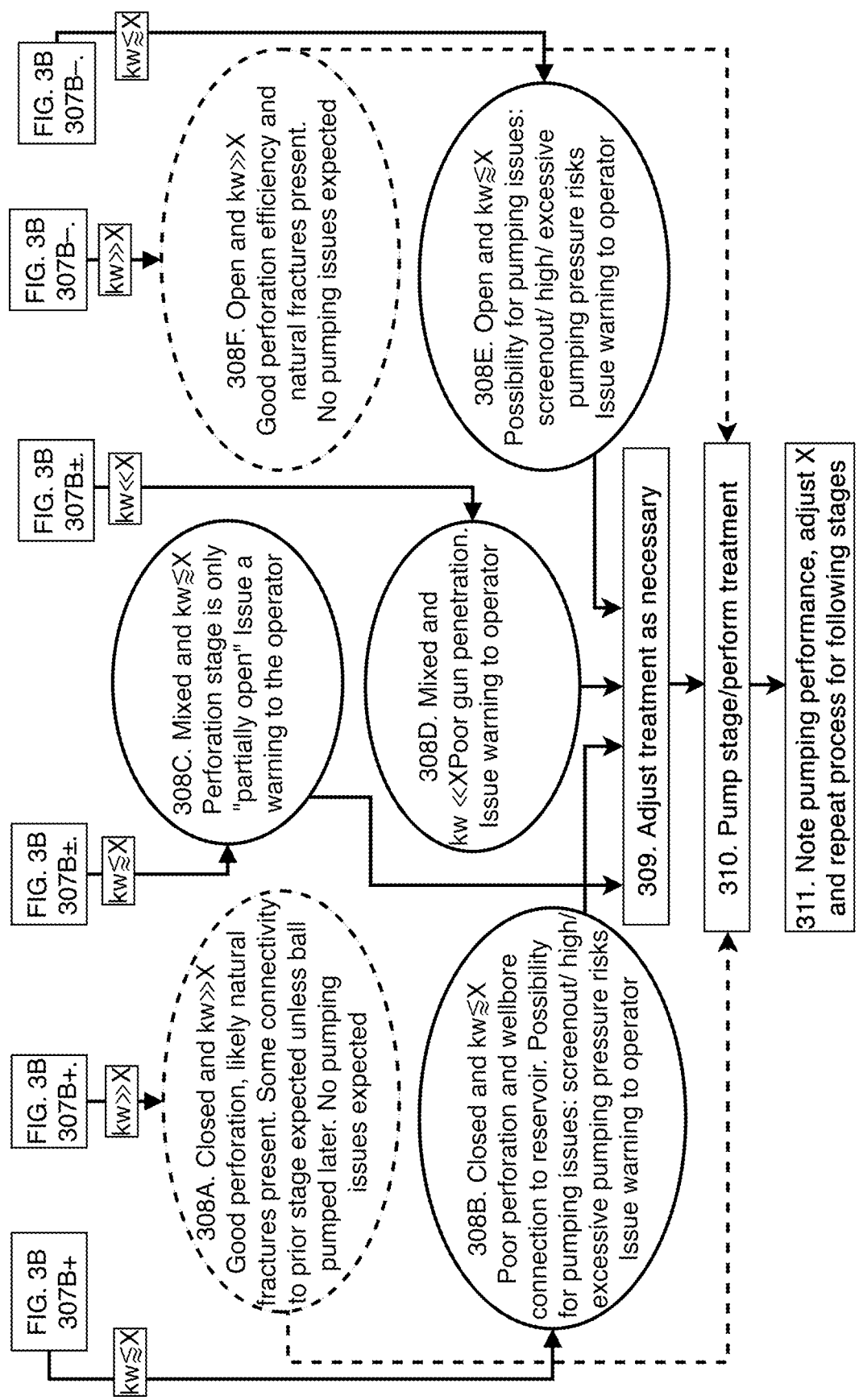

Referring to FIGS. 3A, 3B and 3C, consecutively, an example method according to the present disclosure may be implemented as follows:

In FIG. 3A, at 301, set the plug/isolate the prior fracture treatment stage. During a perforating gun run, a plug attached at the end of a perforating gun would typically be set to isolate the prior pumped fracture treatment stage from the current stage in the well. The result is that a target section is plugged by a known means (i.e., caged ball, solid plug, well bottom, etc.) and the wellbore becomes closed or partially open. This step is commonly known and performed during a multiple stage hydraulic fracturing operation. An effect of a partially open (e.g., no ball) plug can be measured by having only the plug in the well and proceeding through 307, or by modeling and simulation of the plug properties based on dimensions, fluids, and location in the wellbore.

At 302, perforate the well in the current target reservoir zone. Once the plug is set, the perforating gun charges are disposed at predetermined measured depths and patterns to provide hydraulic connection of the well with the reservoir formation. This step is also commonly known and performed. Some or all of these perforation locations will be the originating points of all subsequently pumped hydraulic fractures. The plug type (ball drop, solid, dissolvable, etc.), location and condition (e.g., open or closed) should be taken into account for its effect on inversion for conductivity. In some cases, when a sliding sleeve is used, methods according to the present disclosure can also evaluate the wellbore-reservoir connection of the open sliding sleeve.

At 303, send/generate an acoustic tube wave in the well. In this step, tube waves are generated, in some embodiments at the surface, and start propagating into the well. Note that the well top (the wellhead) is closed during this process, thus having no effect on reflected waves in terms of polarity change. Tube waves are guided pressure waves propagating along the well (wavelength>>well diameter). Tube waves can be generated by a pressure pulse, e.g., an abrupt change in fluid injection rate at the wellhead (usually termed "water hammer:), or by a source as shown in FIG. 1. Prior to tube wave reflection, pressure changes Δp are related to changes in volumetric flow rate Δq by the tube wave hydraulic impedance $Z_T$:

$$\Delta p = Z_T \Delta q \qquad \text{(Eq. 5)}$$

The tube waves reflect based from obstacles or changes in the well, such as perforations, diameter changes, or a plug. Depending on wellbore properties, they will propagate at speeds around 1000-2000 m/s. Analyzable tube wave can also be generated by a perforation gun, wireline itself, or other operational actions such as valve openings or closures.

Figure 6:
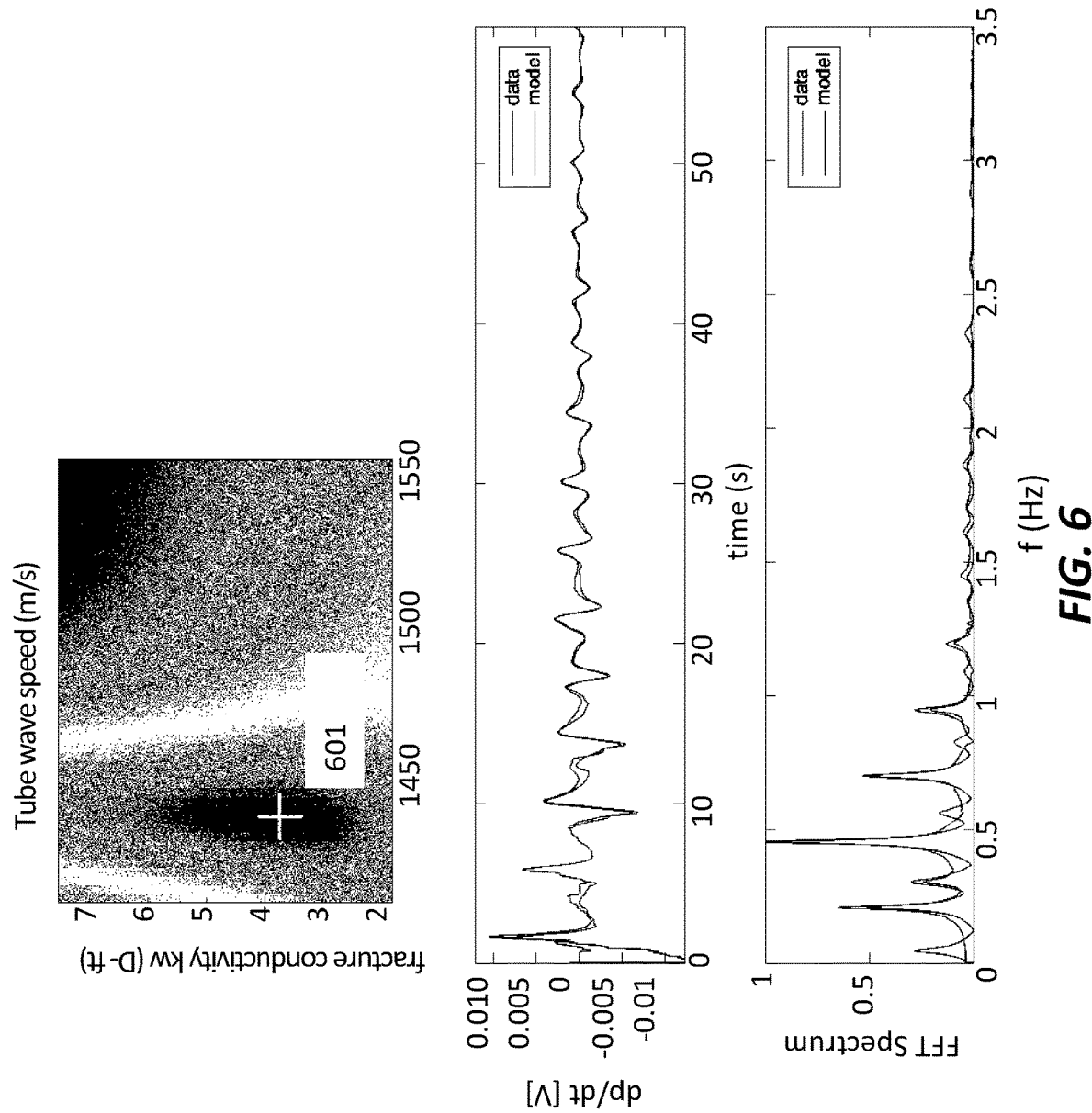
FIG. 6 shows an example of how closely the best fit model matches tube wave reflection data in time and frequency domains.

At 304, record outgoing tube wave pulse and reflections from the zone of interest. Tube wave reflections from hydraulic fractures, recorded with a hydrophone at the wellhead or downhole tools, DAS/DTS, etc. consist of a time series of pressure P(t) of the well fluid, measured with a pressure transducer, and a time series of dP/dt recorded by a specially designed hydrophone or a geophone. The recordings have sensitivity even below ~1 Hz. (FIG. 6 shows an example NF values inversion with focus on low frequencies).

At 305, estimate pre-fracture pumping hydraulic conductivity. In the present embodiment, it is possible to invert for pre-fracture treatment hydraulic conductivity The pre-fracture treatment hydraulic conductivity (C=kw or φC=Nkw/μ) of proppant-filled/or fluid filled perforations in pre fracture treatment conditions may calculated as the product of permeability and perforation width with respect to fluid viscosity for the near field wellbore region. This action may be performed using the method described in the '090 patent cited above. FIG. 6 shows an example of how closely the best fit model matches tube wave reflection data in time and frequency domains. As described above, other ways of measuring this wellbore-reservoir connection, or a perforation efficiency, can also be used but may be less practical (e.g. downhole camera).

Note that "N" typically would be used as a number of perforation clusters. Thus, if a number of perforated clusters, but not the perforation schema (angle, shots per feet, charge weight, charge diameter, etc.) changes from a stage to stage, the kw quantity may be adjusted by a fraction of $N/N_{new}$ to normalize the measurement and allow for appropriate comparison. If the perforation schema (angle, shots per feet, charge weight, charge diameter) change, then the threshold value of X can only be taken as a reference.

At 306, calibrate and re-calibrate measurements. A threshold value X is related to the hydraulic conductivity of the well and reservoir system prior fracture treatment. If the estimated hydraulic conductivity in any zone is below the threshold hydraulic conductivity value X, there may be higher risk of fracture pumping operational problems and screenout of the associated fracture pumping operation. If the estimated conductivity is above X, such risk will be lower. Pre-fracture treatment hydraulic conductivity may be estimated for each fracture treatment stage and the threshold X can be determined, and adjusted, if, and as necessary, from stage to stage, based on operational feedback during the fracturing treatment. Such determination and adjustment may comprise using fracture treatment pumping response, e.g., fluid pressure with respect to time and pumped fluid volume, taking into account fracture treatment parameters such as proppant concentration, proppant grain size distribution, proppant grain shape, fracture fluid viscosity, and the pressure response of the well and reservoir formation system, e.g., fracture fluid flow rate and pressure with respect to time of initiation of fracture treatment pumping.

Analysis of the estimated near field hydraulic conductivity with respect to fluid viscosity (kw or $Nkw/\mu$) of the first one or two stages may be used to create a calibration to set an acceptable value of X depending on treatment design and the characteristics of the reservoir formation. To calibrate, a treatment profile may be taken from the first few fracture treatment stages, or from similar stages on similar reservoir formations and wells as reference points, and value of X may be set based on treatment response during pumping.

Note that a usually a problematic stage will, in terms of pressure, demonstrate high-slope pressure trends during pumping i.e. >~20 psi/minute pressure increase while rate is constant, sudden pressure spikes, and inability to reach rate without exceeding the design pressure. Typically, some stages with no problems during pumping can be correlated with high pre-fracture treatment kw values.

As an optional part of actions taken at 306, the calibration may be performed by modeling of the expected perforations, wellbore, and reservoir and their expected connection. If, for example an expected "good" or acceptable conductivity per simulation is much higher than "X", then any value much (approximately factor of 2 or more) lower than that would raise a flag to the operator. In such a way, having a stage or two to measure actual conductivity is not completely necessary, although it would be preferable as the reservoir, wellbore, and material properties represent many unknowns a simulation may not be able to capture. But an expected kw value can be estimated from a simulation as a reference point.

At 307, evaluate reflected tube wave polarity and hydraulic conductivity with respect to X. Now with reference to FIG. 3B, at 307a. Analyze reflection polarity:

Reflection events have characteristics related to the acoustic impedance change at the effective "bottom" of the wellbore—either the toe or the region before the set isolation plug—giving rise to the reflection event. This acoustic reflectivity indicates closed or open bottom condition of the well. By analyzing the first ~5-10 second —, depending on the depth—of pressure signals, the polarity of an arrival resulting from the impedance contrast (two way time travel), can be defined. An example shown in FIG. 4A has the same (+) polarity and the example shown in FIG. 4B has the opposite polarity (−) in reflected events generated by tube waves. A fully plugged well bottom will have (+) polarity, i.e., the same as the originating wave. Note, that the well top is closed during the pressure measurements, effectively contributing (+), i.e. no change to the measured polarity.

Figure 4A:
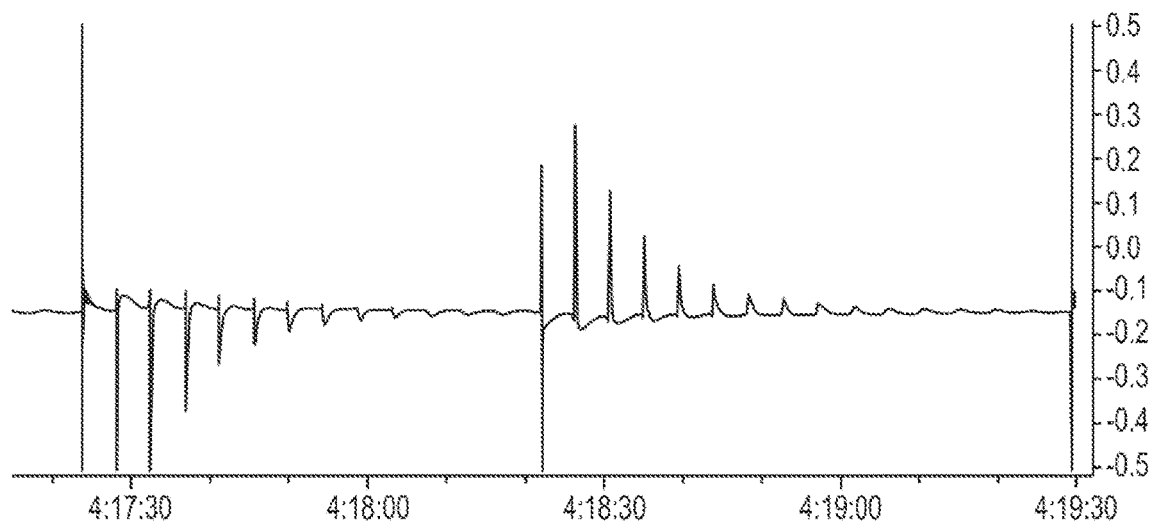
FIG. 4A shows a graph of reflected tube waves which have the same (+) polarity as the originating tube waves, and the opposite polarity (−) in reflected events generated by tube waves is shown in FIG. 4B (4B). A fully plugged well bottom will have (+) polarity.
Figure 4B:
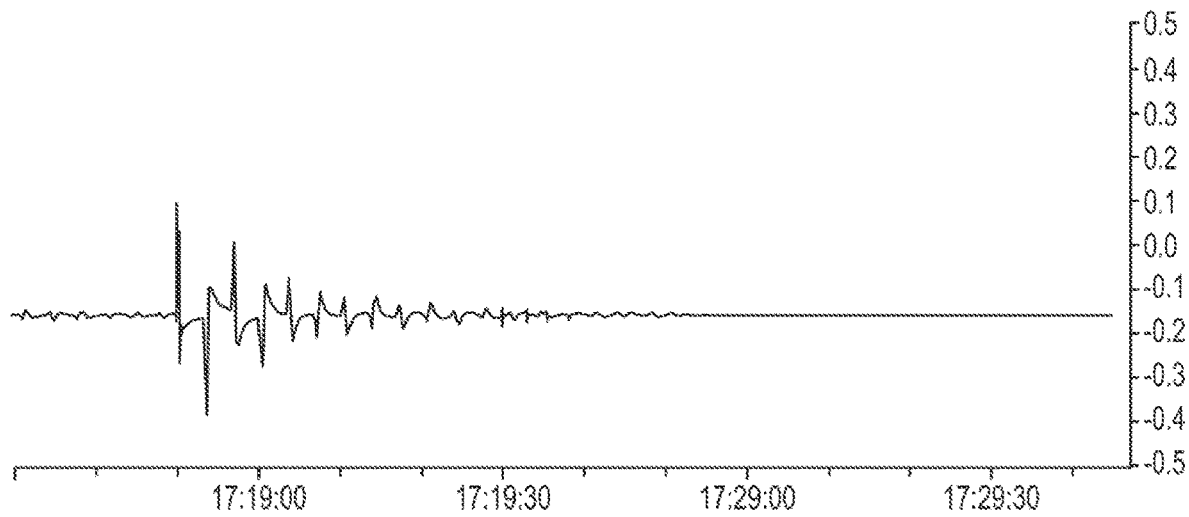

307B+, when the well bottom is closed, the reflected pulses are of same polarity as the originating wave, see FIG. 4A for an example. The "closed" (+) polarity reflection, 307B+, already indicates a potential fracture treatment pumping issue, as effective perforations would have a tendency to 'open' the reservoir-well connection and thus invert the reflected wave polarity. Possible outcomes—in this case where reflected wave polarity is not inverted—of a comparison between kw and X are kw>>X, 308A, and kw≲X, shown at 308B, 307B−, the boundary condition is determined to be open when the reflected pulses change polarities between successive reflections as shown in FIG. 4B. Polarity change indicates an open boundary condition system and negative (−) reflection coefficient. The possible outcomes of a comparison between kw and X are kw>>X, see 308F, and see 308E. Usually, kw>>X and in such case fracture treatment pumping problems would not be expected. However, in the event kw≲X additional evaluation and/or change in fracture treatment parameters may be advised.

307B±. A third, less common condition, 307B± can be defined as 'mixed' polarity. In this case, the polarity starts positive and gradually shifts to negative or vice versa. In the case of mixed polarity, if the near field conductivity estimate is below that of previous stages, or below the threshold X, a "warning" or other signal may be communicated to the operator that the pre fracture treatment hydraulic conductivity may not be optimal with respect to the planned fracture treatment, e.g., the perforation state is only "partially open." If the estimated near field conductivity, kw, is low, very much below X, kw<<X, the problem may be poor perforation efficiency. For example, poor perforation efficiency may exist because of reservoir formation heterogeneity across the zone defined for the particular treatment stage or due to low penetration of the perforation due to rock characteristics (high stress rock, mineralogy, lithology, etc.).

In these cases, the outcomes of the comparison between kw and X should be either kw≲X, as shown at 308C, or kw<<X, as shown at 308D. In both cases indicating potential perforation/pumping issues to the operator. Other bottom hole well conditions may be responsible, but the general procedure is still applicable.

Based on outcomes of comparisons in various scenarios of 307, there are the following general cases, explained with reference to FIG. 3C, highlighted as dashed ovals and lines, with conditions shown at 308A and 308F where no particular difficulties in pumping the stage to design are expected. However, the following general cases: 308B, 308C, 308D, and 308E may require the operator to proceed with caution, and possibly adjust the planned fracture treatment parameters, at 309, to avoid operational difficulties. Examples in alphabetical order follow:

At 308A, polarity indicates a closed boundary condition and kw>>X. Good perforations, and likely, natural fractures are present. Some hydraulic connectivity to a prior fracture treatment stage may be expected unless a plug ball is pumped later. No pumping issues may be expected.

At 308B, polarity indicates a closed boundary condition and kw≲X. Poor perforation and wellbore connection to reservoir. Possibility for pumping issues: screenout, high or excessive pumping pressure risks. Issue warning to the operator.

At 308C, polarity is mixed and kw≲X. In such cases, the perforations in the stage are only "partially open". A warning may be generated and communicated to the operator. Possibility exists for pumping issues such as screenout, high or excessive pumping pressure. Issue warning to the operator.

At 308D, the polarity is mixed and X>>kw. Such condition shows a stage only partially open to the reservoir and may indicate perforating gun failure or poor performance e.g., poor perforating charge penetration into the reservoir formation. A warning may be generated and communicated to the operator. The operator may consider re-perforating the zone or stage of interest.

At 308E, polarity indicates open boundary condition and kw≲X. In such case, the possibility exists for pumping issues such as screenout and high or excessive pumping pressure. Issue a warning to the operator to pump the stage with caution or modify treatment design.

At 308F, the polarity indicates open boundary condition and kw>>X. The foregoing is indicative of good perforation hydraulic efficiency and natural fractures hydraulically connected to the well. No pumping issues would be expected.

Note, that the case of mixed polarity, where kw>>>X is unlikely, as that measurement would mean the wellbore bottom is actually open, case 307B−. This in connection with a mixed polarity could indicate measurement error or another issue.

At 309, adjust treatment as necessary. In the cases described above with reference to 308B, 308C, 308D, 308E, the operator may choose to adjust the planned fracture pumping treatment to avoid excessive pumping pressures and screenouts. Such adjustments may include changing the pumping rate, pumping in acid or other chemicals, reducing the proppant loading, changing the proppant grain shape and/or particle size distribution (for example more abrasive proppant to aggressively ablate the perforations and near-wellbore region), changing the fluid viscosity, using—or avoiding the use of—diverters, and other available tools based on a particular situation. Actions to adjust the fracture treatment may comprise any or all of the following:

More aggressively adjust completion design, inject acid to enhance perforation channels, shoot more guns before commencing pumping operations and carefully monitor pressure to avoid screenouts.

Adjust treatment (type of fluid, maximum proppant concentration, fluid volume, rate) of the upcoming stage to avoid screenouts or other operational (i.e. overpressure) issues.

Adjust treatment of upcoming stage with perforation diverter mid stage, or based on volumetric calculations/estimations of originally open clusters (given lower than expected conductivity) and initiated fractures, or for example use a more abrasive proppant.

In summary, a variety of tools are available for the fracturing engineer to optimize the fracture treatment design, and the particular tools used will depend on a measured severity of the issue (how low is kw), material availability, and costs. Some of them are below: Changing of proppant concentration, proppant density, proppant amount, proppant particle size distribution, proppant particle shape, fluid type/composition, fluid viscosity, fluid viscosity change rate, fluid pumping rate, fluid temperature, fluid chemical composition, chemical additives (e.g. viscosifiers or acids), co-injection of energized gases (nitrogen, $CO_2$, propane, methane) in both liquid and gas phases, injection of petroleum distillates, or pH of injection fluid (acid/base), fluid pumping pressure, diverter type (if any), perforation schema (perforation location, number of perforations, angle of perforations, perforation charge energy, size of perforations, depth of perforations), plug type, and stage length.

At 310, pump the fracture treatment stage and perform the hydraulic fracturing treatment. Based on the above described prior steps, pump the stage either as designed (e.g., if analysis results in cases 308A, 308F), with a modified design, or with appropriate caution and checks—for example setting more aggressive pressure limits—based on the warning.

Figure 8:
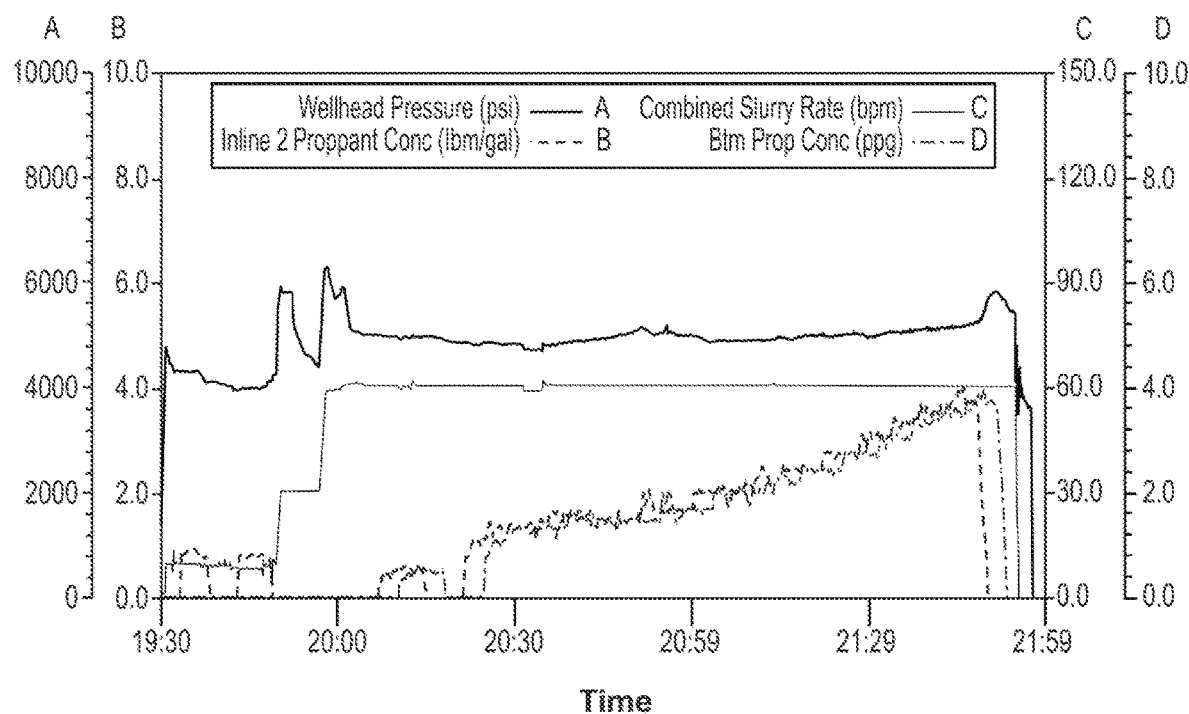
FIG. 8 shows two examples of pumping chart treatment plots for stages that have had a high pre-fracture treatment conductivity, kw, and have pumped with no major complications.
Figure 8:
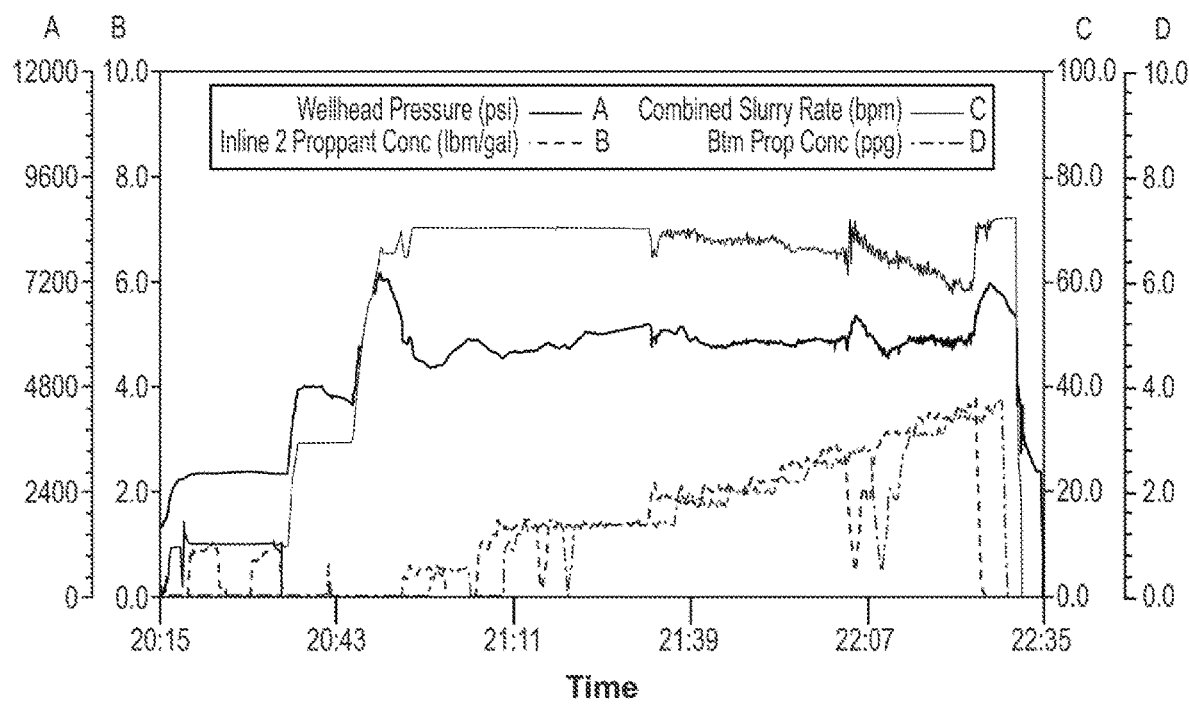
Figure 9:
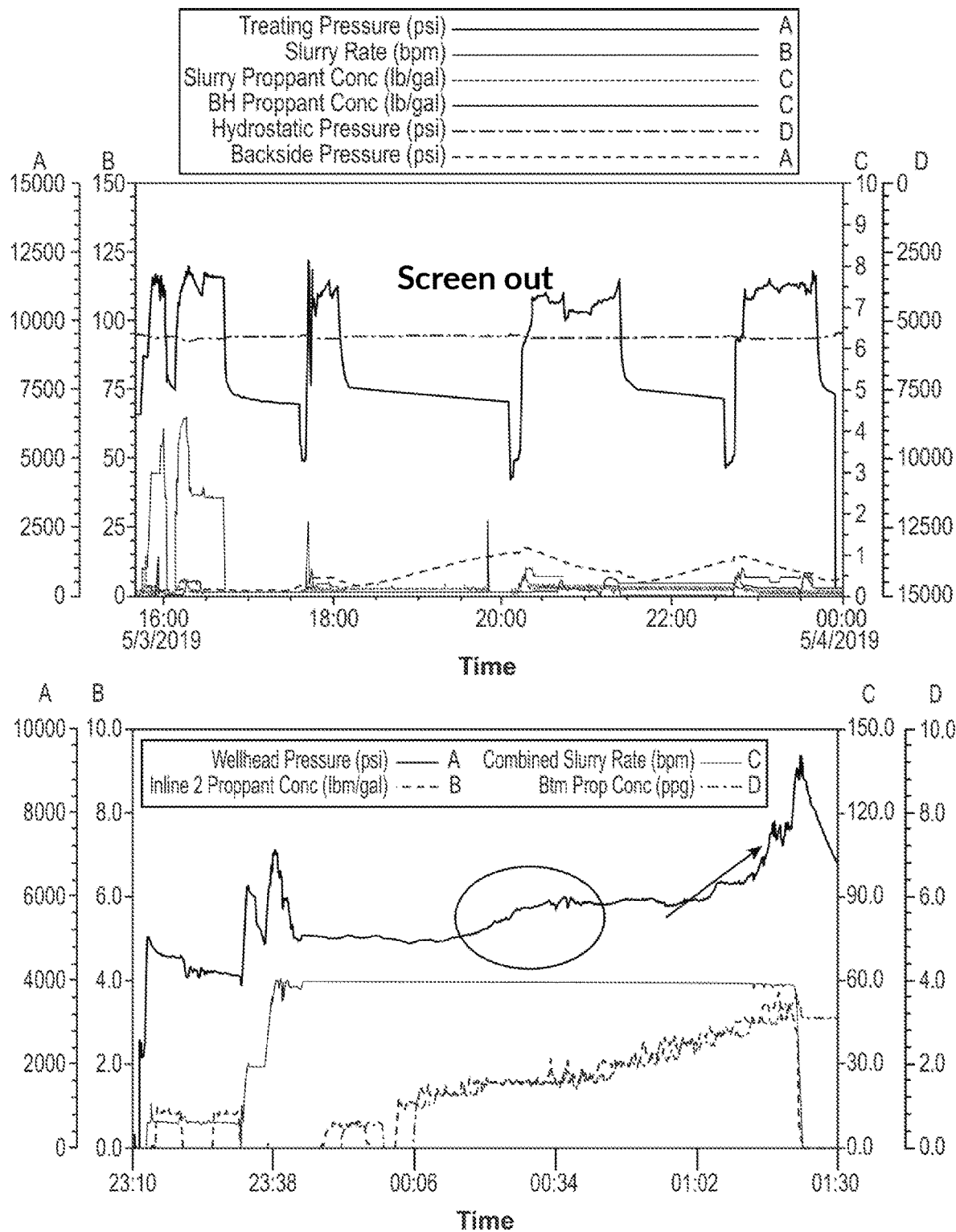
FIG. 9. shows a pumping chart treatment plot for a stage that has had a very low pre-fracture treatment conductivity, kw, has pumped with complications, high pressure and experienced a screenout.

As an example or reference, FIG. 8 shows a pumping chart treatment plot for a stage that has had a high pre-fracture treatment conductivity, kw, kw>>X, and has pumped with no major complications (top). FIG. 9 shows a pumping chart treatment plot for stages that have had a very low pre-fracture treatment conductivity, kw, kw<<X, has pumped with complications, high pressure, difficulties, and experienced a screenout. The complications are labeled, circled, the arrow shows undue pressure rise resulting in an early shut in.

At 311, evaluate the fracture treatment state pumping performance, adjust X and repeat the process for subsequent stages. Based on pumping performance (pressure and flow with respect to time) of the stage pumped, note the value of X, and adjust the following treatment stages and X accordingly. For example, if the stage experienced higher than expected pumping pressures, or faster pressure spikes than ~20 psi/minute (without changes in rate or proppant concentration), or few percent/minute, while kw was only mildly above threshold X, then increase the threshold X. Repeat this process explained with reference to 301-311 for all remaining fracture treatment stages. This analysis can be done on-site and in real-time (for example during wireline changes) as to minimize or eliminate any time delays to operations.

Figure 5:
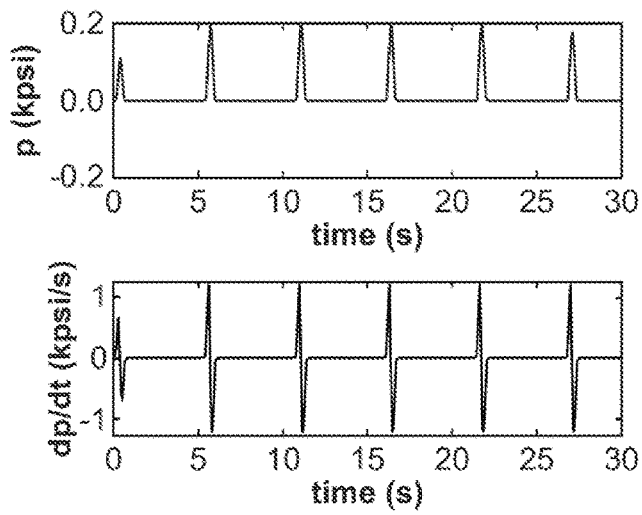
FIG. 5 shows, similar to FIGS. 4A and 4B, open and closed well bottom conditions.
Figure 5:
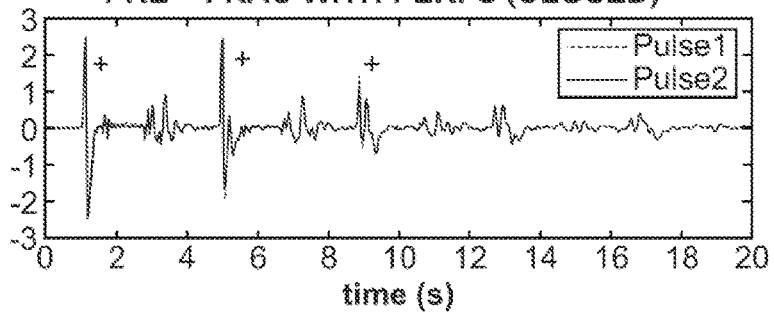
Figure 5:
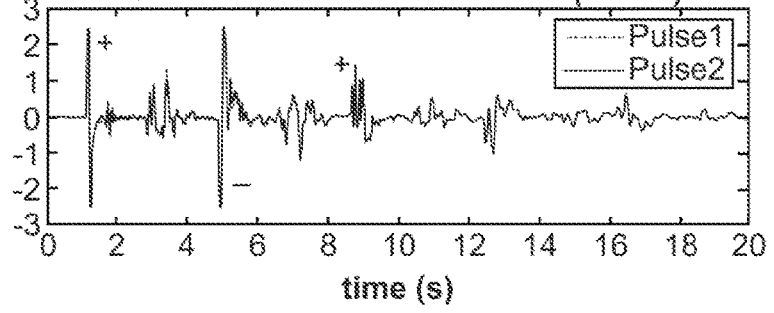

FIG. 5 shows, similar to FIGS. 4A and 4B, open and closed well bottom conditions indicated by reflected wave polarity.

FIG. 6 shows an example of how closely the best fit model matches tube wave reflection data in time and frequency domains in an inversion as explained in U.S. Pat. No. 10,640,090 referred to above.

Figure 7A:
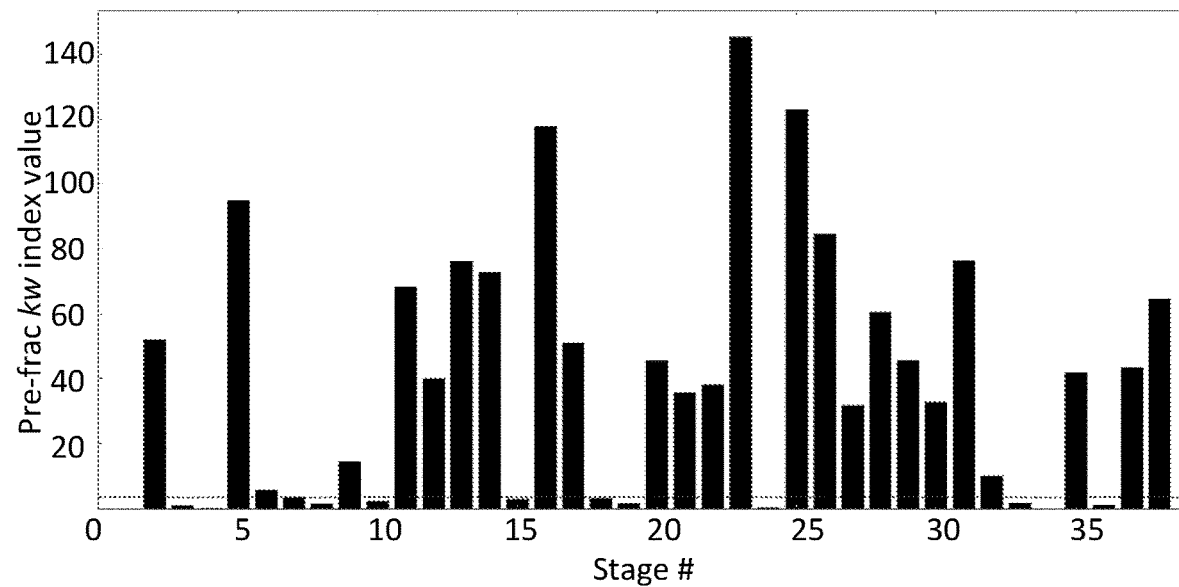
FIG. 7A shows the pre-fracture treatment hydraulic conductivity for 39 stages within a single well with respect to the threshold X.

A study on a single well in the Eagle Ford basin estimated the regional X threshold value equal to 3.5 (dashed line) and the pre-fracture treatment (kw or Nkw/μ) of all the stages were measured shown in FIG. 7A. The boundary condition of 12 stages out of 39 was identified to be closed (X<3.5 threshold).

Mitigation actions were taken to avoid pumping difficulties by adjusting the treatment design to fit the condition of each stage with closed boundary condition. Some of the changes in the treatment design consisted of pumping more acid, reducing the maximum proppant concentration, reducing the pumping rate and in some cases increasing the pad volume and adding gel in the pad to achieve better initiation at the perforation phase. Taking these actions prevented screenouts.

Figure 7B:
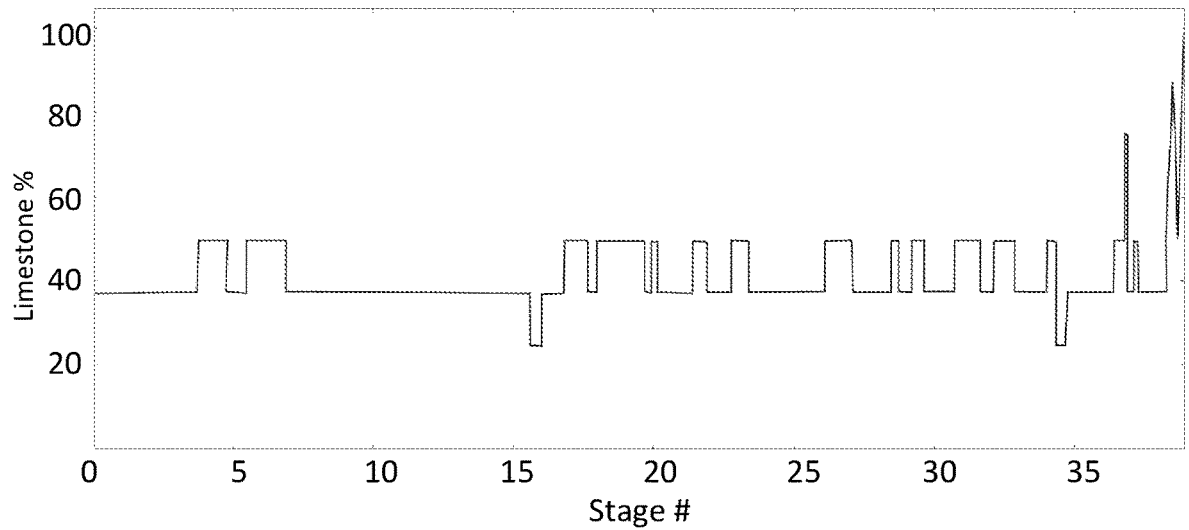
FIG. 7B shows the relationship of lithology with the majority of the identified stages with poor perf to reservoir connection/tunnel efficiency.

FIG. 7B shows the evaluation of the effect of rock properties to the perforation efficiency. The indication in FIG. 7B along the lateral indicates limestone concentration in intervals of 5%, derived from drill cuttings samples (mud logs). As becomes apparent, the majority of the stages in which poor perforation efficiency was measured are stages in which higher limestone concentration was present, or in transitioning zones in terms of limestone concentration.

The formation rock mineral content (lithology) has been observed to have a substantial effect on the perforation efficiency. When limestone concentration increases above 20%, most (~90%) of the stages in this type of rock demonstrate poor perforation efficiency. This observation allows for the optimization of perforation and perforating gun designs (type of charges, limited entry, etc.) in future wells in the area, based on the finding of how limestone concentration relates to the perforation tunnels created.

Figure 10:
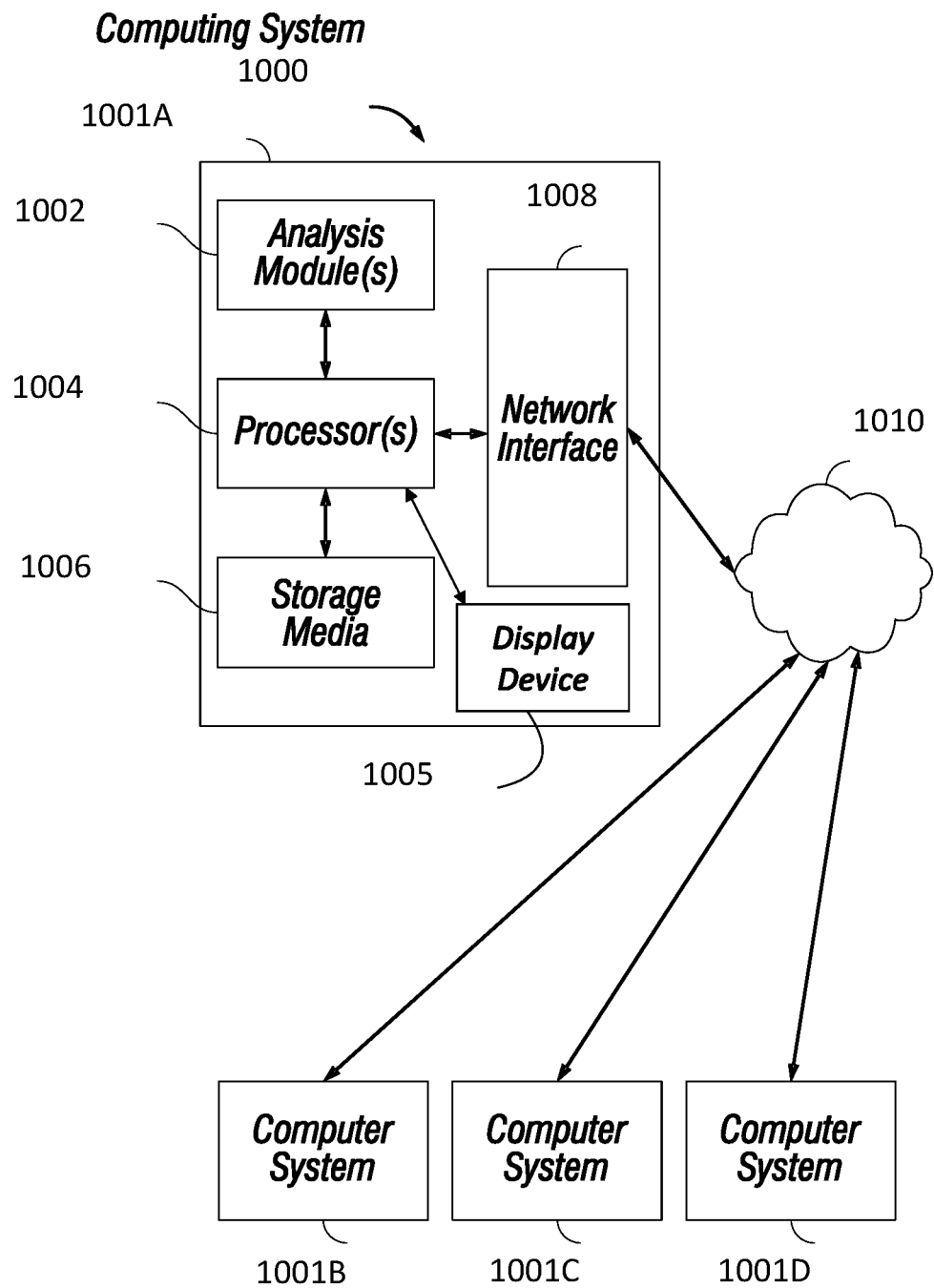
FIG. 10 shows an example computing system that can be used to implement various embodiments of methods according to the present disclosure.

FIG. 10 shows a computing system that can be used to implement the described method. The computing system 1000 may be an individual computer system 1001A or an arrangement of distributed computer systems. The individual computer system 1001A may include one or more analysis modules 1002 that may be configured to perform various tasks according to some embodiments, such as the tasks explained with reference to FIG. 10. To perform these various tasks, the analysis module 1002 may operate independently or in coordination with one or more processors 1004, which may be connected to one or more storage media 1006. A display device 1005 such as a graphic user interface of any known type may be in signal communication with the processor 104 to enable user entry of commands and/or data and to display results of execution of a set of instructions according to the present disclosure.

The processor(s) 1004 may also be connected to a network interface 1008 to allow the individual computer system 1001A to communicate over a data network 1010 with one or more additional individual computer systems and/or computing systems, such as 1001B, 1001C, and/or 1001D (note that computer systems 1001B, 1001C and/or 1001D may or may not share the same architecture as computer system 1001A, and may be located in different physical locations, for example, computer systems 1001A and 1001B may be at a well drilling location, while in communication with one or more computer systems such as 1001C and/or 1001D that may be located in one or more data centers on shore, aboard ships, and/or located in varying countries on different continents).

A processor may include, without limitation, a microprocessor, microcontroller, processor module or subsystem, programmable integrated circuit, programmable gate array, or another control or computing device.

The storage media 1006 may be implemented as one or more computer-readable or machine-readable storage media. Note that while in the example embodiment of FIG. 10 the storage media 1006 are shown as being disposed within the individual computer system 1001A, in some embodiments, the storage media 1006 may be distributed within and/or across multiple internal and/or external enclosures of the individual computing system 1001A and/or additional computing systems, e.g., 1001B, 1001C, 1001D. Storage media 1006 may include, without limitation, one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that computer instructions to cause any individual computer system or a computing system to perform the tasks described above may be provided on one computer-readable or machine-readable storage medium, or may be provided on multiple computer-readable or machine-readable storage media distributed in a multiple component computing system having one or more nodes. Such computer-readable or machine-readable storage medium or media may be considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

It should be appreciated that computing system 1000 is only one example of a computing system, and that any other embodiment of a computing system may have more or fewer components than shown, may combine additional components not shown in the example embodiment of FIG. 10, and/or the computing system 1000 may have a different configuration or arrangement of the components shown in FIG. 10. The various components shown in FIG. 10 may be implemented in hardware, software, or a combination of both hardware and software, including one or more signal processing and/or application specific integrated circuits.

Further, the acts of the processing methods described above may be implemented by running one or more functional modules in information processing apparatus such as general purpose processors or application specific chips, such as ASICs, FPGAs, PLDs, or other appropriate devices. These modules, combinations of these modules, and/or their combination with general hardware are all included within the scope of the present disclosure.

A method according to the present disclosure may provide a fracture treatment operator the ability to adjust fracture treatment parameters within each stage of a multiple stage treatment to reduce the risk of screenout, overly high pumping pressures, and other pumping system failures.

Although only a few examples have been described in detail above, those skilled in the art will readily appreciate that many modifications are possible in the examples. Accordingly, all such modifications are intended to be included within the scope of this disclosure as defined in the following claims.

What is claimed is:

1. A method for predicting fracture treatment performance, comprising:
    inducing tube waves in a well drilled through a formation to be fracture treated during or after opening a wellbore fluid connection to the formation;
    determining a polarity of reflected tube waves in the well and using the reflected tube waves to estimate hydraulic conductivity of at least one zone in the well hydraulically connected to the formation;
    comparing the estimated hydraulic conductivity to a selected threshold, the selected threshold based on pumping parameters of at least one pumped hydraulic fracture treatment; and
    generating a warning signal when the hydraulic conductivity is below the selected threshold and/or the determined polarity indicates a closed boundary condition.

2. The method of claim 1 wherein the at least one pumped hydraulic fracture treatment is made in a treatment stage in the well already having a fracture treatment pumped into the treatment stage.

3. The method of claim 1 wherein the selected threshold is estimated using measurements from at least one pumped hydraulic fracture treatment made in a different well.

4. The method of claim 1 wherein the selected threshold is obtained from a model or simulation.

5. The method of claim 1 wherein the opening the wellbore connection to the reservoir includes the perforating operations.

6. The method of claim 1 wherein the opening the wellbore fluid connection comprises opening a sliding sleeve.

7. The method of claim 1 further comprising changing at least one fracture treatment parameter from a fracture treatment plan and pumping a fracture treatment using the changed at least one fracture treatment parameter.

8. The method of claim 7 wherein the at least one fracture treatment parameters comprises at least one of proppant concentration, proppant density, proppant amount, proppant particle size distribution, proppant particle shape, fluid type/composition, fluid viscosity, fluid viscosity change rate, fluid pumping rate, fluid temperature, fluid chemical composition, chemical additives, co-injection of energized gases in both liquid and gas phases, injection of petroleum distillates, pH of injection fluid, fluid pumping pressure, diverter type, perforation location, number of perforations, angle of perforations, size of perforations, perforation charge energy, depth of perforations, plug type, and stage length.

9. The method of claim 1 where the threshold determined to issue a warning is adaptively re-calibrated.

10. A method for predicting fracture treatment performance, comprising:
inducing tube waves in a well drilled through a formation to be fracture treated;
determining a polarity of reflected tube waves in the well and using the reflected tube waves to estimate hydraulic conductivity of at least one zone in the well hydraulically connected to the formation;
comparing the estimated hydraulic conductivity to a selected threshold, the selected threshold based on pumping parameters of at least one pumped hydraulic fracture treatment;
comparing the estimated hydraulic conductivity to lithology content; and
generating a warning signal when the hydraulic conductivity is below the selected threshold and/or the determined polarity indicates a closed boundary condition.

11. The method of claim 10 where the lithology content includes at least one of limestone component and other minerals that could affect the efficiency of perforations.

12. An apparatus/system embedded in a computer, the computer having logic thereon operable to cause the computer to perform:
operating a source to induce tube waves in a well drilled through a formation to be fracture treated during or after opening a wellbore fluid connection to the formation;
determining a polarity of reflected tube waves in the well and using the reflected tube waves to estimate hydraulic conductivity of at least one zone in the well hydraulically connected to the formation;
comparing the estimated hydraulic conductivity to a selected threshold, the selected threshold based on pumping parameters of at least one pumped hydraulic fracture treatment; and
generating a warning signal when the hydraulic conductivity is below the selected threshold and/or the determined polarity indicates a closed boundary condition.

13. A non-transitory computer readable medium having logic stored thereon, the logic operable to cause a programmable computer to perform acts comprising:
operating a source to induce tube waves in a well drilled through a formation to be fracture treated during or after opening a wellbore fluid connection to the formation;
determining a polarity of reflected tube waves in the well and using the reflected tube waves to estimate hydraulic conductivity of at least one zone in the well hydraulically connected to the formation;
comparing the estimated hydraulic conductivity to a selected threshold, the selected threshold based on pumping parameters of at least one pumped hydraulic fracture treatment; and
generating a warning signal when the hydraulic conductivity is below the selected threshold and/or the determined polarity indicates a closed boundary condition.

14. The non-transitory computer readable medium of claim 13 wherein the at least one pumped hydraulic fracture treatment is made in a treatment stage in the well already having a fracture treatment pumped into the treatment stage.

15. The non-transitory computer readable medium of claim 13 wherein the selected threshold is estimated using measurements from at least one pumped hydraulic fracture treatment made in a different well.

16. The non-transitory computer readable medium of claim 13 wherein the selected threshold is obtained from a model or simulation.

17. The non-transitory computer readable medium of claim 13 wherein the opening the wellbore connection to the reservoir includes the perforating operations.

18. The non-transitory computer readable medium of claim 13 wherein the opening the wellbore fluid connection comprises opening a sliding sleeve.

19. The non-transitory computer readable medium of claim 13, wherein the logic is further operable to cause the computer to perform changing at least one fracture treatment parameter from a fracture treatment plan and pumping a fracture treatment using the changed at least one fracture treatment parameter.

20. The non-transitory computer readable medium of claim 19 wherein the at least one fracture treatment parameters comprises at least one of proppant concentration, proppant density, proppant amount, proppant particle size distribution, proppant particle shape, fluid type/composition, fluid viscosity, fluid viscosity change rate, fluid pumping rate, fluid temperature, fluid chemical composition, chemical additives, co-injection of energized gases in both liquid and gas phases, injection of petroleum distillates, pH of injection fluid, fluid pumping pressure, diverter type, perforation location, number of perforations, angle of perforations, size of perforations, perforation charge energy, depth of perforations, plug type, and stage length.

21. The non-transitory computer readable medium of claim 13 wherein the threshold determined to issue a warning is adaptively re-calibrated.

* * * * *